United States Patent
Kahlert et al.

(10) Patent No.: US 11,733,211 B2
(45) Date of Patent: Aug. 22, 2023

(54) METHOD AND DEVICE FOR TESTING A COMPONENT NON-DESTRUCTIVELY

(71) Applicant: Siemens Energy Global GmbH & Co. KG, Munich (DE)

(72) Inventors: Philipp Kahlert, Solingen (DE); Michael Opheys, Nettetal (DE); Andreas Sperling, Duisburg (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 437 days.

(21) Appl. No.: 16/968,581

(22) PCT Filed: Jan. 17, 2019

(86) PCT No.: PCT/EP2019/051139
§ 371 (c)(1),
(2) Date: Aug. 8, 2020

(87) PCT Pub. No.: WO2019/162003
PCT Pub. Date: Aug. 29, 2019

(65) Prior Publication Data
US 2021/0041401 A1 Feb. 11, 2021

(30) Foreign Application Priority Data
Feb. 23, 2018 (DE) ..................... 10 2018 202 757.9

(51) Int. Cl.
*G01N 29/07* (2006.01)
*G01D 5/48* (2006.01)
(Continued)

(52) U.S. Cl.
CPC .............. *G01N 29/07* (2013.01); *G01D 5/48* (2013.01); *G01N 29/225* (2013.01);
(Continued)

(58) Field of Classification Search
CPC .... G01N 29/07; G01N 29/225; G01N 29/265; G01N 29/221; G01N 29/043;
(Continued)

(56) References Cited

U.S. PATENT DOCUMENTS

| 5,535,628 | A |   | 7/1996 | Rutherford |
| 5,654,510 | A | * | 8/1997 | Schneider ............. G01M 17/10 |
|  |  |  |  | 73/622 |

(Continued)

FOREIGN PATENT DOCUMENTS

| DE | 19943215 A1 | 4/2001 |
| DE | 102008005971 A1 | 7/2009 |

(Continued)

OTHER PUBLICATIONS

Norm: "Norm DIN EN ISO 10863, Dec. 2011, Zerstörungsfreie Prüfung von Schweißverbindungen—Ultraschallprüfung—Anwendung der Beugungslaufzeittechnik (TOFD) (ISO 10863:2011 )"; German version EN ISO 10863:2011; pp. 1-36; URL: http:/lperinorm/Perinorm-Volltexte/2016-11_Grunbestand/CD21 DE_04/1801972/1801972.pdf?; [retrieved on Jul. 13, 2018].; ["Non-destructive testing of welds—Ultrasonic testing—Use of time-of-flight diffraction technique (TOFD)" English abstract attached].

(Continued)

*Primary Examiner* — Jacques M Saint Surin

(57) ABSTRACT

A method for testing a component non-destructively, particularly for internal defects, includes the following steps: a) providing a rotationally symmetrical component having a plurality of preferably cylindrical recesses, which are arranged at one or more hole circles, b) arranging a transmitter probe serving as an ultrasound transmitter and a receiver probe serving as an ultrasound receiver spaced apart from each other outside the component such that ultrasound waves can be irradiated into a shaded area located behind one of the recesses in the component by the transmitter (Continued)

probe and ultrasound waves which are diffracted at least at one defect present in the shaded area can be received by the receiver probe, and c) using time of flight to determine whether one or more faults are present in the shaded area. An apparatus carries out such a method.

17 Claims, 4 Drawing Sheets

(51) Int. Cl.
  *G01N 29/22* (2006.01)
  *G01N 29/265* (2006.01)

(52) U.S. Cl.
  CPC ..... *G01N 29/265* (2013.01); *G01N 2291/011* (2013.01); *G01N 2291/023* (2013.01); *G01N 2291/0289* (2013.01); *G01N 2291/048* (2013.01); *G01N 2291/102* (2013.01); *G01N 2291/26* (2013.01)

(58) Field of Classification Search
  CPC ... G01N 2291/2634; G01N 2291/0289; G01N 2291/023; G01N 2291/2693; G01N 2291/269; G01N 2291/26; G01N 2291/102; G01N 2291/048; G01N 2291/011; G01D 5/48
  USPC .......................................................... 73/598
  See application file for complete search history.

(56) References Cited

U.S. PATENT DOCUMENTS

| | | | | |
|---|---|---|---|---|
| 7,367,236 | B2 * | 5/2008 | Georgeson | G01N 29/2475 73/12.09 |
| 9,835,596 | B2 * | 12/2017 | Guan | G01N 29/069 |
| 2002/0088282 | A1 | 7/2002 | Zayicek et al. | |
| 2007/0000328 | A1 | 1/2007 | Buttram | |
| 2015/0035523 | A1 * | 2/2015 | Lombardo | G01N 27/908 73/633 |
| 2017/0328871 | A1 | 11/2017 | Paul et al. | |

FOREIGN PATENT DOCUMENTS

| | | | | |
|---|---|---|---|---|
| DE | 102008027228 A1 * | 12/2009 | .......... | G01N 29/043 |
| DE | 102011108730 A1 | 1/2013 | | |
| DK | 1087229 T3 | 10/2009 | | |
| EP | 1087229 A2 * | 3/2001 | .......... | G01N 29/221 |
| EP | 2238443 B1 | 7/2012 | | |
| EP | 3239706 A1 | 11/2017 | | |

OTHER PUBLICATIONS

Habibpour-Ledari All et al: "Three Dimensional Characterization of Defects by Ultrasonic Time-of-Flight Diffraction (ToFD) Technique", Journal of Nondestructive Evaluation, Plenum Publishing Corporationt. New York, US, vol. 37. No. 1, pp. 1-11, XP036441521, ISSN: 0195-9298, DOI: 10.1007/S10921-018-0465-5; [retrieved on Feb. 7, 2018], pp. 2, Paragraph 2.Locating . . . ; Figures 1-5; 2018.
Norm: "Norm DIN EN 583-6, Mar. 2009, Zerstörungsfreie Prüfung—Ultraschallprüfung—Teil 6: Beugungslaufzeittechnik, eine Technikzum Auffinden und Ausmessen von Inhomogenitäten"; German version EN 583-6:2008. pp. 1-26. URL:http://perinorm/Perinorm-Volltexte/ Grundbestand/CD21 DEH 11/1499456/1499456.pdf? [retrieved on Jul. 13, 2018].; ["Non-destructive testing—Ultrasonic testing—Part 6: Diffraction transit time technique, a technique for finding and measuring inhomogeneities" English abstract attached].
Norm: "Norm DIN EN 15617, Jul. 2009, Zerstörungsfreie Prüfung von Schweißverbindungen—Beugungslaufzeittechnik (TOFD)—Zulässigkeitsgrenzen"; German version EN 15617:2009; pp. 1-16. URL: http://perinorm/Perinorm-Volltexte/Grundbestand/ CD21DEH _08/1472751/1472751.pdf? [retrieved on Jul. 13, 2018].; ["Non-destructive testing of welded connections—diffraction delay technology (TOFD)—admissibility limits" English abstract attached].
PCT International Search Report and Written Opinion of International Searching Authority dated Mar. 29, 2019 corresponding to PCT International Application No. PCT/EP2019/051139 filed Jan. 17, 2019.

* cited by examiner

METHOD AND DEVICE FOR TESTING A COMPONENT NON-DESTRUCTIVELY

CROSS REFERENCE TO RELATED APPLICATIONS

This application is the US National Stage of International Application No. PCT/EP2019/051139 filed 17 Jan. 2019, and claims the benefit thereof. The International Application claims the benefit of German Application No. DE 10 2018 202 757.9 filed 23 Feb. 2018. All of the applications are incorporated by reference herein in their entirety.

FIELD OF INVENTION

The invention relates to a method for non-destructive testing of a component. The invention also relates to a device for performing said method.

BACKGROUND OF INVENTION

Various methods are known from the prior art for examining components non-destructively for the presence of flaws such as cracks, for instance. In addition to magnetic-particle and eddy-current testing methods, a component can also be tested non-destructively by means of ultrasonic waves.

The time-of-flight diffraction (TOFD) technique, which is standardized in standards DIN EN 583-6, DIN EN 15617 and DIN EN ISO 10863, is used for non-destructive testing of welds.

It is also known practice to use for non-destructive testing what are called phased array probes, which can include both a linear array and also a matrix array. Probes of this type comprise a plurality of ultrasonic sensors, which can also be referred to as individual elements. These are used to couple or beam an ultrasonic wave into a component under test, and to receive back a reflected ultrasonic signal. This typically involves using an associated control unit to switch a group of the individual elements as transmitters and another group as receiver elements. In the context of phased array ultrasonic probes, reference is made to DE 10 2011 108 730 A1 purely by way of example.

The applicant has ascertained that the phased array technique, in particular for the non-destructive inspection of rotationally symmetric components comprising a plurality of openings, for instance cylindrical holes or the like, that are arranged on one or more hole circles, does not provide reliable data for all the component regions. It has been found that especially flaws which, viewed from the outside, lie radially below or behind openings in such a component cannot be detected reliably using the phased array technique.

It is necessary to be able to perform a comprehensive test of all the component segments, however, in order to provide reliable information, for instance about the remaining service life of components.

SUMMARY OF INVENTION

It is therefore the object of the present invention to define a method for non-destructive testing of components which allows those regions of components of the aforementioned type that are not accessible according to the prior art also to be tested for flaws.

This object is achieved by a method for non-destructive testing of a component for, in particular, internal flaws, comprising the following steps: a) providing a rotationally symmetric component which comprises a plurality of advantageously cylindrical openings, in particular holes, that are arranged on one or more hole circles and are advantageously spaced at least substantially equidistantly apart from one another; b) arranging outside the component a transmitter probe acting as an ultrasonic transmitter and a receiver probe acting as an ultrasonic receiver, which are spaced apart from each other such that the transmitter probe can beam ultrasonic waves into a shadow region lying behind one of the openings in the component, and the receiver probe can receive ultrasonic waves which are diffracted at at least one flaw present in the shadow region; and c) determining, using the time-of-flight diffraction technique, whether one or more flaws are present in the shadow region.

In other words, the fundamental idea of the present invention consists in applying the ultrasonic testing method of the time-of-flight diffraction (TOFD) technique as it is known, which is already used for non-destructive testing of welds, in order to scan, in rotationally symmetric components having a plurality of openings, also the regions that are in the "shadow" of the openings. For the ultrasonic time-of-flight diffraction technique, instead of using just one probe as the transmitter and receiver, the transmitter and receiver are separate and are spaced apart from one another. As ascertained by the applicant, this makes it possible "to peep" behind openings, for instance a plurality of holes on one or more hole circles for a screwed flange connection. Thus, by virtue of the procedure according to the invention, non-destructive inspection for flaws is also possible in regions that are regarded as untestable according to the prior art. As a result, it is possible to obtain a comprehensive picture even in the presence of a plurality of openings.

The fact that the time-of-flight diffraction (TOFD) technique does not depend on the beam angle or the reflectance helps to make flaws detectable that cannot be located using the phased array technique for instance.

The method according to the invention has proved especially well-suited to finding cracks that the applicant was able to observe in the region of screwed connections of (hollow) shafts in particular of saturated steam sub-turbines in nuclear power plants comprising what is known as a "stub shaft". For the screwed connection, a plurality of axial threaded holes are located in the hollow shaft, which are spaced equidistantly apart from one another on a hole circle that is coaxial with the rotational axis of the hollow shaft. As a consequence of operation, cracks form in the region of the threaded holes, which cracks emanate from the associated hole and extend both radially outwards and radially inwards. While the cracks or crack segments that extend radially outwards can be detected by means of the phased array technique, this is not the case for the cracks or crack segments running radially inwards. These lie in the regions referred to in this document as "shadow regions", which lie radially behind or below the holes, i.e. radially further inwards than the holes, and in particular adjoin the associated hole, and are in the "shadow" of the holes in the phased array technique.

It should be mentioned that the time-of-flight diffraction (TOFD) technique is used to test not just shadow regions lying behind openings but, as part of the method according to the invention, this technique can obviously also be used additionally to examine other component regions.

A particular embodiment of the method according to the invention is characterized in that, in a provided component, shadow regions behind a plurality of openings can be inspected for flaws non-destructively, this being done by performing the steps b) and c) for each opening, in particular hole. Obviously, it is also possible that shadow regions behind all the openings, in particular holes, present in a component are tested.

A relative movement of component and transmitter and receiver probes can take place during a test procedure in order to be able to test a plurality of shadow regions easily. In a development of the method according to the invention, it can accordingly be provided that the transmitter and receiver probes and the component are moved relative to one another, advantageously that the transmitter and receiver probes and/or the component perform a relative movement in the circumferential direction. In principle, it is both possible for the transmitter and receiver probes to be mounted in a fixed spatial position, i.e. fixed in place, while the component under test is moved, and for the converse case to be possible, or for both component and probes to move in particular in opposite directions to one another. If the component is a shaft, for instance a hollow shaft, the rotatable mounting provided anyway in the assembled state can be used for the rotation of said component. The shaft can perform a rotation through 360° in order to cover the entire circumference. It is then possible in particular to test via TOFD an annular region of the component, which region lies behind openings, in particular holes.

If a relative movement of component and probes is made, at least one encoder, which is in contact with the component, is advantageously used to acquire the position of the transmitter and/or receiver probe relative to the component.

A further embodiment of the method according to the invention is characterized in that, in step b), the transmitter and receiver probes are arranged such that ultrasonic waves radiated by the transmitter probe into the shadow region propagate to one side of the opening lying in front of the shadow region, and ultrasonic waves that are diffracted at at least one flaw present in the shadow region and reach the receiver probe propagate to the opposite side of the opening lying in front of the shadow region. The transmitter and receiver probes are arranged in step b) in particular in a V-transmission.

A further embodiment is characterized in that the component is inspected in the assembled state non-destructively for flaws. In particular, in step a) of the method, a cylindrical hollow shaft is provided, which is advantageously closed at both end faces in the assembled state.

The hole circle(s) on which openings in the component are arranged is/are advantageously coaxial with the rotational axis of the component. The rotational axis refers here to that axis in relation to which rotational symmetry exists.

In a further particularly advantageous embodiment, the transmitter and receiver probes are provided on a curved rail, in particular a rail in the shape of a circular ring or circular ring segment, each advantageously attached by means of a probe mount. A rail of such a shape has been found to be particularly suitable for mounting at least two probes at a specified separation from one another on a rotationally symmetric component with which the probes are advantageously meant to be brought into contact for a scan procedure, in particular for a V-transmission. The rail can be held, for example, by a user by hand in such a way that the probes mounted thereon are in contact with a component under test, even when the component is moved, in particular rotated, during a measurement in order to cover a larger test region.

If a curved rail is used, it is arranged particularly advantageously coaxial with the rotational axis of the component. Alternatively or additionally, it can be provided that the radius of the rail is selected according to, or is dependent on, the radius of the component. The radius of the rail is then advantageously selected according to the outer radius of the advantageously cylindrical component, for instance such that it slightly exceeds the outer radius.

Moreover, the transmitter and receiver probes are advantageously mounted on the rail at a specified separation from one another and/or at a defined angle of incidence, wherein the specified separation and/or defined angle of incidence is advantageously selected according to a radius of the component and/or the positions and/or size of openings in the component. The separation and/or angle is selected for testing the shadow regions expediently such that ultrasonic waves can be beamed by the transmitter probe into the relevant shadow region, and waves diffracted in the shadow region can be detected by the receiver probe. In other words, the separation is advantageously selected such that the transmitter and receiver probes "look" into the relevant shadow region, which lies directly behind the particular opening, in particular hole. Other separations and/or angles can be conveniently selected for testing other component regions.

It is additionally provided in a development that a blind distance from the relevant opening is calculated as a function of the dimensioning of the component and/or the position and/or size of openings and/or the position of the transmitter probe and/or receiver probe, which blind distance defines a blind region, in which flaws in the shadow region cannot be detected, and which is advantageously incorporated in a calculation of the size of detected flaws. Since the transmitter and receiver probes "look" in particular from both sides at an oblique angle in behind the relevant opening, as a rule there will always be a small region that continues to be hidden by, i.e. in the "shadow" of, the relevant opening. The extent of this region, starting from the opening radially inwards, is referred to in this document as the blind distance. If a flaw is detected in a shadow region, i.e. behind an opening or lying radially further inwards than this opening, and it is known that, as a result of operation, cracks are present in the component that emanate from the openings, in particular holes, and extend radially inwards, it can be assumed that the crack also extends over the blind region, which can then be taken into account in the calculation or estimate of the crack length.

A further particularly advantageous embodiment of the method according to the invention is moreover characterized in that the component is additionally examined non-destructively for flaws using at least one phased-array ultrasonic probe. The pulse-echo method can advantageously be employed in this case. Particularly advantageously, at least one region of the component, which region lies radially further inwards in relation to the rotational axis of the component, is tested using the time-of-flight diffraction technique, and a region lying radially further out in relation to the rotational axis is tested using the phased array technique. For instance, it can be provided that regions lying in front of openings in the component, i.e. radially further out than openings, are examined for flaws using at least one phased-array ultrasonic probe. Additional component regions can likewise be tested using this technology. Examples of such regions are those lying between adjacent openings. For a comprehensive picture, the phased array technique is used particularly advantageously to test all the regions of a component that are unable to be tested via TOFD, and/or vice versa. In addition, regions can be tested using both TOFD and the phased array technique. In this case, a correlation of results from both measurement techniques can also be performed. For example, the results from the TOFD measurement can be used to verify flaws found by means of the phased array method and, if applicable, to verify the size thereof.

The non-destructive test using at least one phased-array ultrasonic probe can take place, for example, before or else after a TOFD test.

In addition, it can be provided that a test of shadow regions is performed at a plurality of different axial positions, for instance two different axial positions. Alternatively or additionally, a test by means of the phased array technique can similarly be performed at a plurality of different axial positions.

A further subject of the present invention is a device for performing the method according to the invention, comprising—a transmitter probe acting as an ultrasonic transmitter, which is designed to emit ultrasonic waves; —a receiver probe acting as an ultrasonic receiver, which is designed to detect ultrasonic waves; —a curved rail, in particular a rail in the shape of a circular ring or circular ring segment, on which the transmitter probe and the receiver probe are mounted.

The position of the transmitter probe and/or the receiver probe can be freely adjustable on the rail, wherein in particular locking means are provided, by means of which the transmitter probe and/or the receiver probe can each be locked in a selected position. The transmitter probe and/or the receiver probe are advantageously mounted on the rail in a manner that allows angular adjustment, for instance are mounted such that they can pivot about a pivot axis, in order to be able to select or modify the angle of incidence conveniently and quickly.

It is also possible that the transmitter and/or the receiver probe can be positioned and locked at defined positions on the rail. The positions have been defined in particular in advance for a component of given geometry or else a plurality of components of different geometries, and can then be selected conveniently and quickly during a measurement procedure. It is conceivable, for example, that, for one component type, two different predefined positions and/or angular orientations for the transmitter probe and/or the receiver probe are provided and/or marked on the rail. A position and/or angular setting can then be used, for example, for examining the shadow regions, and another position and/or angular setting for examining, for example, regions that lie radially in front of openings, i.e. radially further out than these openings. It is also possible that different defined positions and/or angular settings exist for different component types, so that the device can be adjusted very quickly and reliably to suit another component geometry.

The transmitter probe and/or the receiver probe are in addition advantageously each mounted on the rail by means of a probe mount, which in particular has been manufactured by a rapid prototyping process. Suitable probe mounts can be produced particularly quickly by generative manufacturing processes, while having maximum flexibility in terms of shape.

The device according to the invention additionally comprises in a development at least one encoder, which in particular is to be brought into contact with a component under test, and is designed to acquire the position of the transmitter probe and/or receiver probe relative to the component. In the situation in which component and probes perform a movement relative to one another, for instance in order to scan a plurality of shadow regions for flaws, the given relative position can be acquired reliably using an encoder.

A further embodiment is characterized in that the device comprises at least one phased-array ultrasonic probe, so that non-destructive testing of a component by means of the phased array method is additionally possible. If such a probe is provided, the device additionally comprises advantageously a phased array encoder, which is assigned to the phased-array ultrasonic probe and in particular is to be brought into contact with a component under test, and which encoder is designed to acquire the position of the phased-array ultrasonic probe relative to the component. For the phased-array ultrasonic probe, a probe mount can likewise be provided which advantageously has likewise been manufactured by means of a rapid prototyping process. The probe mount can have a handle, by means of which a user can conveniently bring the probe into a required position and hold the probe in this position.

In addition, the device can comprise at least one memory and/or analysis unit, which is used to store and/or analyze measurement signals that have been acquired using the probes and/or one or more encoders. The memory and/or analysis unit can comprise, or be given by, for example, an ultrasonic apparatus, if applicable connected to a computer.

It should be mentioned that in principle it is possible that the device according to the invention comprises, in addition to the transmitter and receiver probes mounted on the rail and any phased array probe that may be present, also one or more additional probes, for instance in order to be able to test a greater component volume in a shorter time by means of simultaneous measurements. This applies correspondingly also to the method according to the invention.

BRIEF DESCRIPTION OF THE DRAWINGS

Further features and advantages of the invention are explained using the following description of an exemplary embodiment of the method according to the invention and of the device according to the invention with reference to the accompanying drawing, in which.

DETAILED DESCRIPTION OF INVENTION

Figure 1:
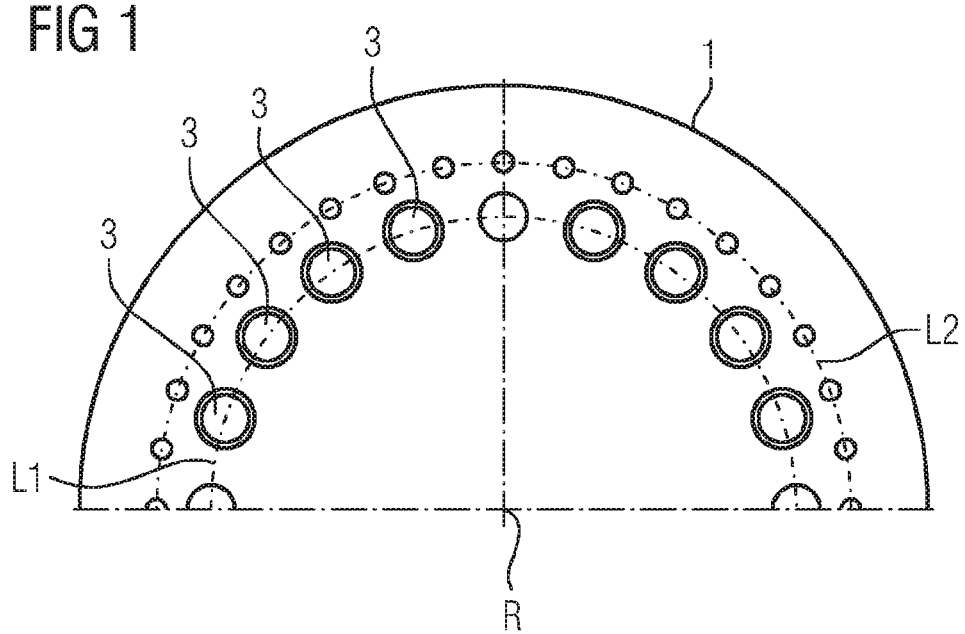
FIG. 1 shows a schematic partial view of a stub shaft of a hollow shaft of a saturated steam sub-turbine of a nuclear power plant.

FIG. 1 shows in a purely schematic diagram a front view of the top half of a stub shaft 1, which can be screwed at the end face onto the hollow shaft 2 (shown in FIGS. 2 to 6) of a saturated steam sub-turbine (not shown in the figures) of a nuclear power plant.

As shown in FIG. 1, a multiplicity of through-holes 3 extending in an axial direction are provided in the stub shaft 1 on the end face, which through-holes are arranged on a hole circle L1, which is shown in FIG. 1 for the purpose of clarity. The through-holes 3 serve in the assembled state for the screwed connection of the stub shaft 1 to the hollow shaft 2. The stub shaft 1 has on its end face also a multiplicity of cylindrical openings 4, which are arranged on an additional hole circle L2 having a slightly larger radius than the hole circle L1 of the through-holes 3 and which have a diameter that is significantly less than the diameter of the through-holes 3. The cylindrical openings 4 are provided for balancing weights. Both hole circles L1, L2 are coaxial with the rotational axis R of the shaft 1, which in FIGS. 2 to 5 lies perpendicular to the drawing plane.

Figure 2:
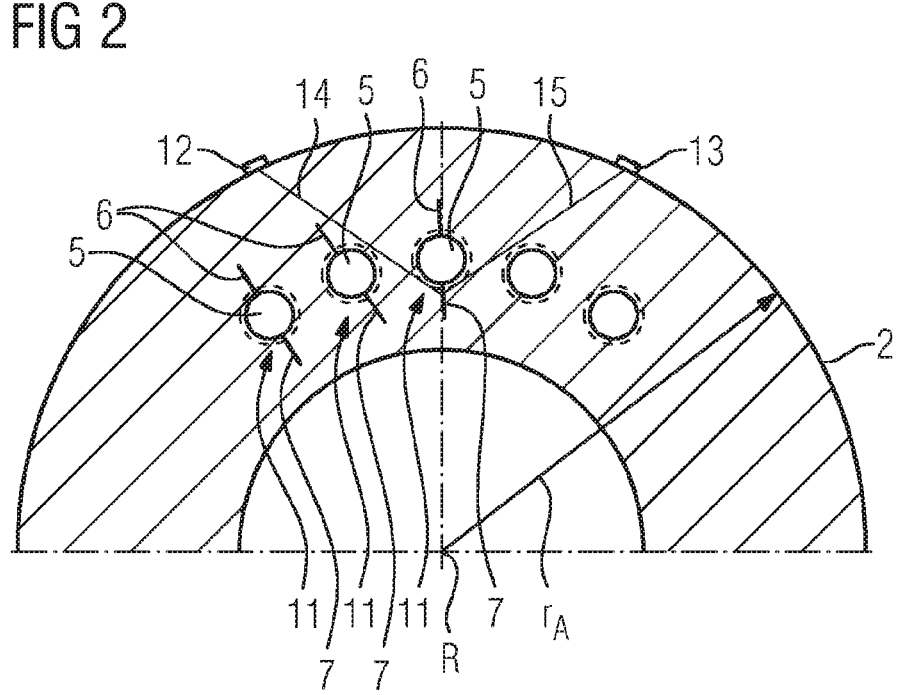
FIG. 2 shows a purely schematic, partially sectional diagram of a hollow shaft of a saturated steam sub-turbine of a nuclear power plant, onto which the stub shaft of FIG. 1 can be screwed.

In the hollow shaft 2 shown in FIG. 2, threaded holes 5 corresponding to the through-holes 3 are provided, which accordingly are likewise arranged on the hole circle L1, and into which in the assembled state screws (not shown in the figures) are screwed, which extend through the through-holes 3, and the heads of which rest against contact surfaces provided there, as is well known for a screwed flanged connection.

The applicant was able to ascertain as part of a routine inspection that, as a result of operation, cracks form in the region of the threaded holes 5 in the hollow shaft 2 for the screwed connection to the stub shaft 1, in particular in the region of the base of the threaded holes 5, which cracks emanate from the threaded holes 5 and are oriented in the radial direction both outwards and inwards. FIG. 2 shows this by way of example for three of the threaded holes 5. It should be mentioned that, in FIG. 2, only some of the threaded holes 5 provided on the end face of the shaft 2, specifically only five of the threaded holes 5, are shown by way of example. In this figure, the cracks extending from the associated threaded hole 5 radially outwards are denoted by way of example by 6, and the cracks extending from the associated threaded hole 5 radially inwards by 7.

The turbine shaft 2 constitutes a safety-relevant, highly stressed component, and consequently non-destructive testing of the regions around the threaded holes 5 is necessary in order to verify that there are no cracks. It has been found here that the cracks 6 running radially outwards can be verified by means of the ultrasonic phased-array technique, in which crack detection is based on utilizing reflected ultrasonic signals.

Figure 3:
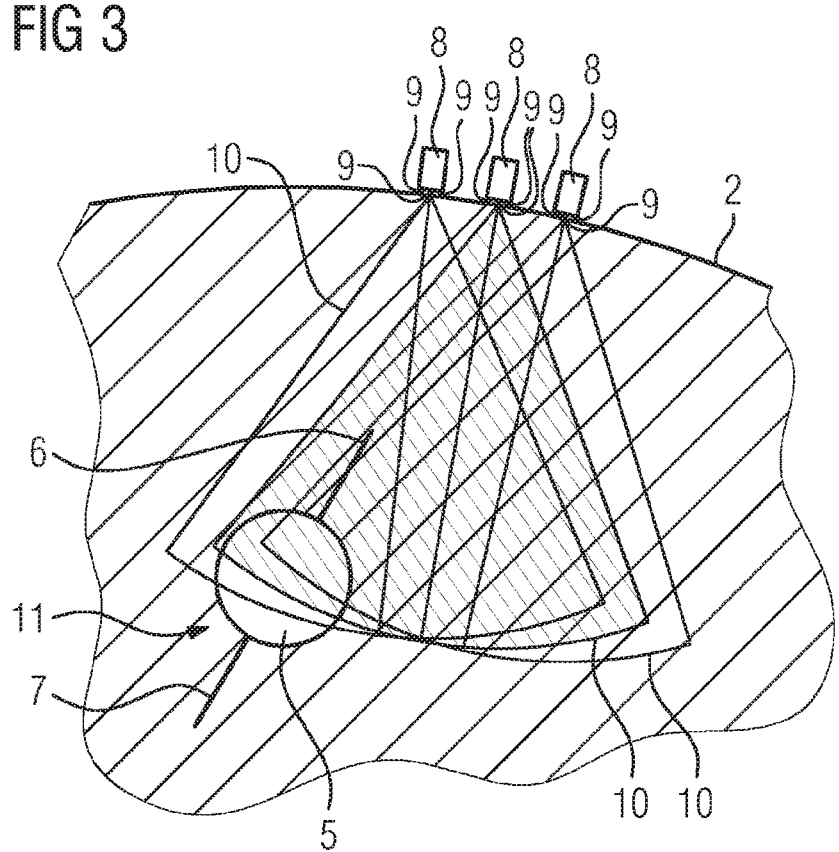
FIG. 3 shows a purely schematic, partially sectional diagram for illustrating the testing of the hollow shaft of FIG. 2 using the phased array technique.

FIG. 3, which shows an enlarged partial sectional view of the turbine shaft 2 in which only one threaded hole 5 is visible, illustrates this purely schematically. For the non-destructive testing by means of the phased array technique, an ultrasonic phased-array probe 8 is arranged on the surface of the turbine shaft 2, which probe is shown in three different test positions purely by way of example in FIG. 3. The ultrasonic phased-array probe 8 comprises a plurality of individual elements 9, each of which can act as an ultrasonic transmitter or receiver. In FIG. 3, only three of the plurality of individual elements 9 are shown, purely by way of example.

A circular sector 10, which is meant to illustrate a sector scan in the circumferential direction, is shown for each of the three test positions. The central circular sector 10 is shaded so that it can be distinguished more clearly. For a sector scan, by electronically controlling a plurality of individual elements 9, for each probe position, ultrasonic signals are transmitted or received and captured in a defined central angular range. FIG. 3 illustrates travel of the probe 8, during which the sector scan is used to detect a potential flaw, which, in the form of the crack 6, is oriented from the threaded hole 5 radially towards the outer surface of the turbine shaft 1. At the right-hand position of the three probe positions, the probe 8 can detect the diffraction signals from the tip of the crack 6 by the outer central beam. At the left-hand probe position, the tip of the crack 6 is detected almost by the perpendicular central beam emission. This sector scan in combination with movement of the probe 8 in the circumferential direction (and/or rotation of the shaft 1) allows analysis of the dynamics of a flaw in the circumferential direction. In order to detect potential flaw progressions in the axial direction, the phased array probe 8 can be arranged such that it is turned through 90° and again rotated about the shaft in the circumferential direction (and/or vice versa). For the non-destructive testing, a plurality of individual elements 9 couple ultrasonic waves into the shaft 2 at angles of incidence within fixed ranges, and a plurality of individual elements 9 switched as receivers detect ultrasonic waves reflected at the crack 6 running radially outwards, with the result that this crack can be located.

The situation is different for the crack 7 running radially inwards. This crack lies, from the viewpoint of the probe 8, behind the threaded hole 5, which reflects ultrasonic signals coupled in by the probe 8 and thus prevents ultrasonic signals from being able to be beamed into the region lying therebehind. The region lying radially below or behind the threaded hole 5 is therefore referred to as a shadow region 11 in this document. As a result of the shadowing effect of the threaded hole 5, it is not possible to detect the crack 7 running radially inwards by means of the phased array technique.

The present invention addresses this problem by using the ultrasonic time-of-flight diffraction (TOFD) technique for non-destructive inspection of the shadow regions 11 behind the threaded holes 5 in the hollow shaft 1.

Figure 4:
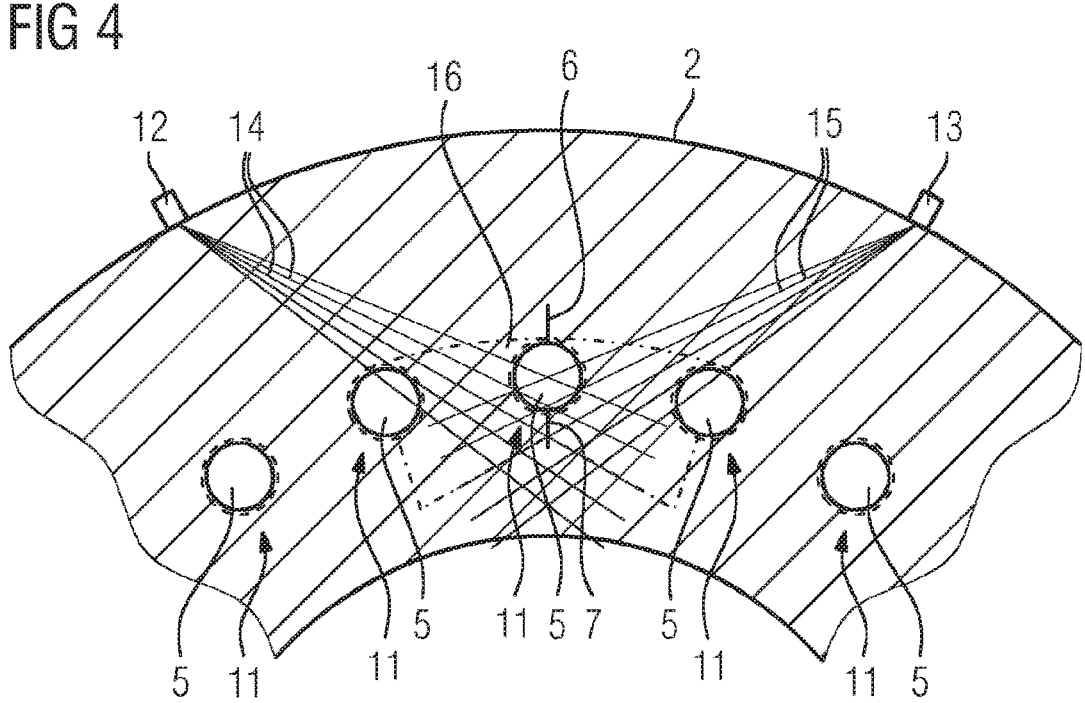
FIG. 4 shows an enlarged purely schematic, partially sectional diagram for illustrating the non-destructive testing of a shadow region of the hollow shaft of FIG. 2 via TOFD.

In this technique, instead of using just one probe 8 acting as transmitter and receiver, a separate transmitter and receiver are used, which can be combined with graduated wedges in order to achieve different ultrasonic angles of incidence in the shaft 1. Specifically, as shown purely schematically in FIGS. 2 and 4, a transmitter probe 12 acting as an ultrasonic transmitter and a receiver probe 13 acting as an ultrasound receiver are arranged spaced apart from one another externally on the shaft 2, and arranged in such a way that the transmitter probe 12 can radiate ultrasonic waves into a shadow region 11 behind a threaded hole 5, and the receiver probe 13 can receive or detect ultrasonic waves that are diffracted at at least one crack 7 present in the shadow region 11. In this case, an interplay between angle of incidence and probe separation must be taken into account in order to define a required focal depth. For purely schematic illustrative purposes, FIG. 2 shows a central line 14 representing the ultrasonic signals emitted by the transmitter probe 12, and the central beam of the receiver as the central line 15, which represents the ultrasonic wave diffracted at a crack 7 in the shadow region 11 and propagating to the receiver probe 13. FIG. 4 shows an enlarged schematic diagram for the non-destructive testing according to the invention of the shadow region 11 of the central threaded hole 5 via TOFD, in which a plurality of representative lines 14 and 15 for the transmitter and receiver probes 12, 13 respectively are indicated, which in each case represent the 6 dB decrease in sound pressure. Since the central beam 15 of the receiver probe 13 and the central beam 14 of the transmitter probe 12 intersect the tip of the crack 7, the flaw can easily be detected via TOFD. The figure also indicates a region 16 which surrounds the threaded hole 5 in the center in FIG. 4 and the shadow region 11 thereof, which can be tested when the probes 12, 13 are in the position shown in FIG. 4.

Ultrasonic waves which are beamed by the transmitter probe 12 into the shadow region 11 propagate to one side of the threaded hole 5 lying in front of the shadow region 11 (see the lines 14), and ultrasonic waves which are diffracted at one crack or even a plurality of cracks 7 in the shadow region and reach the receiver probe 13 propagate to the opposite side of the threaded hole 5, which is the right-hand side in FIGS. 2 and 4 (see line(s) 15). The probes 12, 13 are arranged such that what is known as a V-transmission exists.

Figure 5:
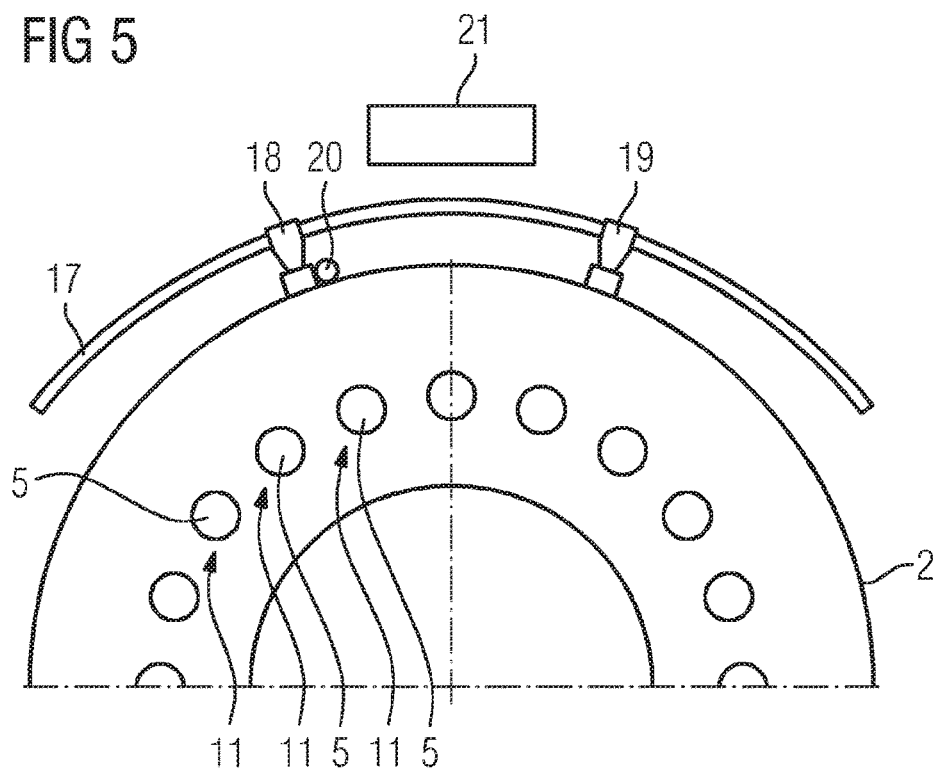
FIG. 5 shows a purely schematic partial view of the end face of the hollow shaft of FIG. 2 together with an embodiment of a device according to the invention for non-destructive testing.
Figure 6:
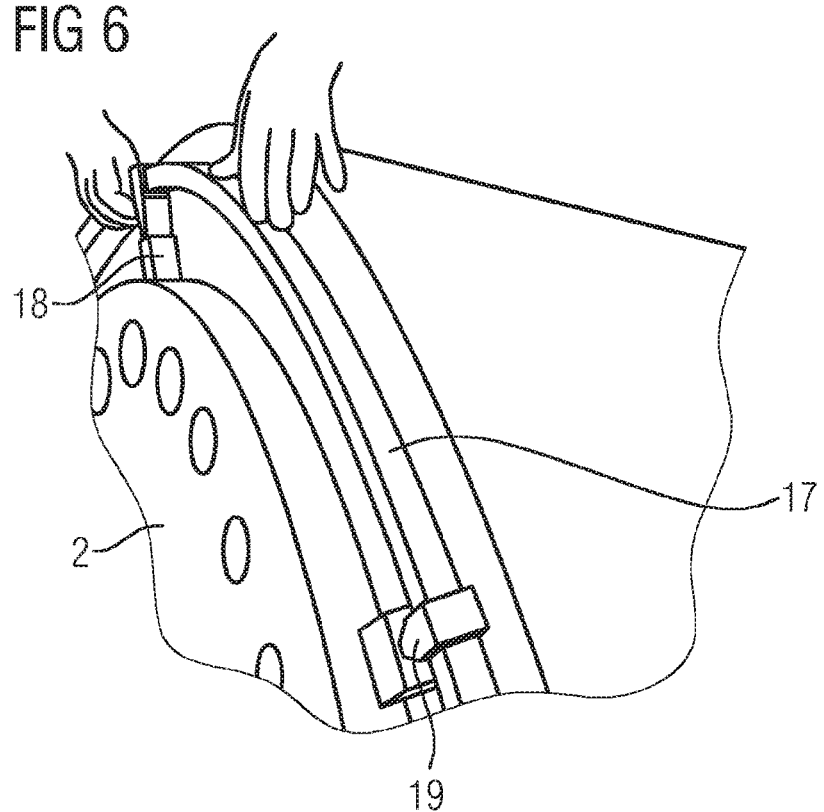
FIG. 6 shows a perspective view of the hollow shaft and parts of the device of FIG. 5.

The two probes 12, 13 are part of an embodiment of a device according to the invention for non-destructive testing, which is shown purely schematically in FIGS. 5 and 6. The device comprises, in addition to the probes 12, 13, a curved rail 17, which in the present case is in the shape of a circular ring segment. As is evident in particular in FIG. 5, the radius of the rail 17 is slightly larger than the outer radius rA of the hollow shaft 1, which is indicated in FIG. 2, and in the present case the rail 17 in the shape of a circular ring segment spans an angle of approximately 100°, so less than a third of a full circle.

On the rail 17, the two probes 12, 13 are spaced apart from each other by means of a transmitter or receiver probe mount 18, 19 respectively, which is manufactured by a rapid prototyping process, and mounted therein. Each of the two probe mounts 18, 19 holds one of the probes 12, 13, and each probe 12, 13 is held at the end of the associated probe mount 18, 19 that faces radially inwards so that said probe comes into contact with the surface of the hollow shaft 1 when the rail 17 is arranged as shown in FIGS. 5 and 6. The probes 12, 13 held by the mounts 18, 19 are not visible in FIG. 5.

The device also comprises an encoder 20, which is mounted on the transmitter probe mount 18. The encoder 20 is used to acquire the current position, relative to the hollow shaft 2, of the transmitter probe 12 held by the transmitter probe mount, when the probes 12, 13 and the hollow shaft 1 perform a movement relative to one another during a measurement procedure, further details of which will be given later.

The two probes 12, 13 and the encoder 20 are connected to a central memory and analysis unit 21 of the device via cables, which are not shown in the figures.

For non-destructive testing of the hollow shaft 2, first a TOFD measurement is performed by the device from FIG. 5, for which purpose the rail 17, together with the probe mounts 18, 19 mounted therein and the two probes 12, 13, is arranged by hand on the casing side of the hollow shaft 2 at a plurality of defined axial positions in succession, as is shown in FIGS. 5 and 6 for one position. The plurality of axial positions at which the rail 17, together with the probes 12, 13, is arranged in succession are obtained from fixed turbine-blade positions. In general, an axial position is selected for each row of turbine blades before the blades (steam inlet side) and after the blades (steam outlet side) in order to be able to test the entire axial region of the openings under test, in this case threaded holes 5. The precise axial positions are obtained in this case from the specific turbine design.

When the rail 17 is arranged as shown in FIGS. 5 and 6 for one axial position, it is coaxial with the rotational axis R of the shaft 2. A frame (not shown in the figures) on which a user can walk in order to hold the rail 17 appropriately can be provided to the side of the shaft 2.

Once the rail 17 is positioned as shown in FIGS. 5 and 6, the probes 12, 13 are activated, with the result that ultrasonic waves are emitted by the transmitter probe 12 and captured by the receiver probe 13, and the hollow shaft 2 is rotated about its rotational axis R through one full revolution, i.e. through 360°. As a result of the relative movement of probes 12, 13 and shaft 2 in the circumferential direction, the transmitter probe 12 beams ultrasonic waves into all the shadow regions 11 behind the threaded holes 5 on the hole circle L1 in succession, and the receiver probe 13 can detect ultrasonic waves that are diffracted at cracks 7 running radially inwards that may be present in the relevant shadow region 11, with the result that the shadow regions 11 behind all the threaded holes 5 can be tested in succession non-destructively for flaws. It should be mentioned that in particular an annular region lying behind, i.e. radially further inwards than the holes 5, is tested by means of the scan during a full rotation of the shaft 2.

It should also be mentioned that, owing to the fact that the transmitter and receiver probes 12, 13 "look" from both sides at an oblique angle in behind the associated hole 5, there will always be a small "blind region", which directly adjoins the associated hole radially inwards and lies in the associated shadow region 11, which blind region continues to be concealed by, i.e. in the "shadow" of, the threaded hole 5. The extent thereof radially inwards, starting from the associated hole 5, is referred to in this document as the blind distance, which is calculated as a function of the dimensioning of the shaft 2 and/or the position and/or size of the threaded holes 5 and/or the position of the transmitter and/or receiver probe 12, 13, and which is taken into account in a calculation of the size of detected cracks 7 if applicable.

Following the TOFD measurement of the shadow regions 11, additional regions can be tested non-destructively for flaws, likewise via TOFD, for instance regions that lie radially in front of the threaded holes 5, i.e. radially further outwards than these holes. For this purpose, the separation on the rail 17 of the two probes 12, 13 and/or of the two probe mounts 18, 19 carrying these probes can be altered, for instance reduced, and/or the angle of incidence of both probes 12, 13 is increased, for instance, by wedges, which cause the probes 12, 13 to "look" at a point lying radially further outwards (reduce the focal depth of the central beam), and the shaft 2 is rotated again through 360° while ultrasonic waves are emitted by the transmitter probe 12 and captured by the receiver probe 13. An annular segment of the shaft 2, which segment encloses the holes 5, is thereby tested. Positions for the transmitter and receiver probe mounts 18, 19 that correspond to different test regions, for instance different radial positions, can be defined on the rail 17.

Figure 7:
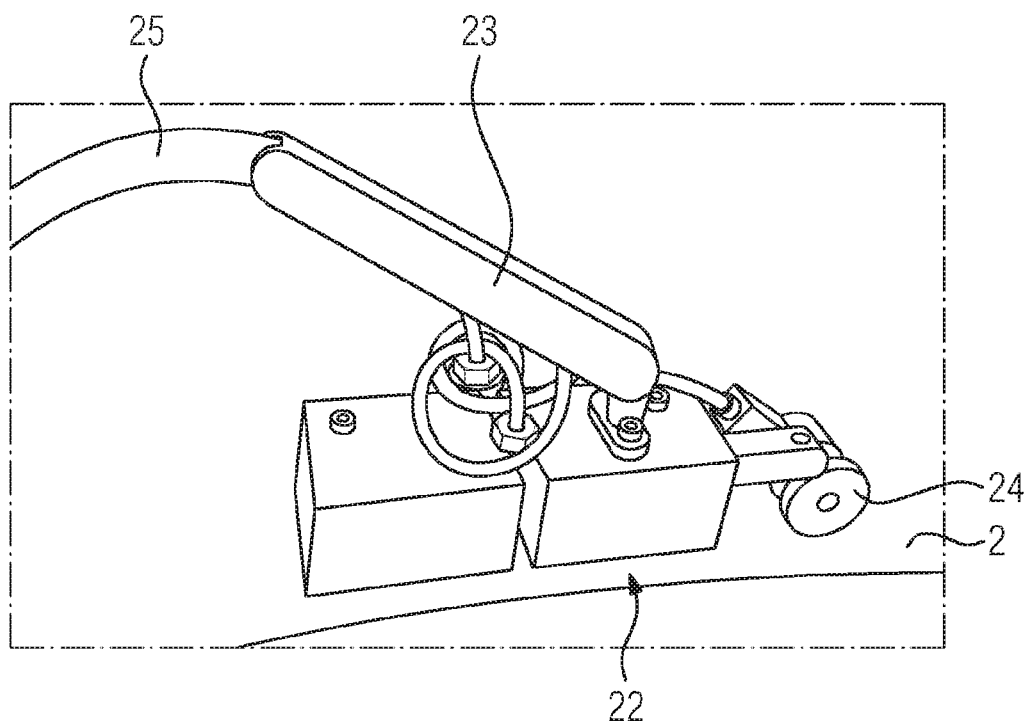
FIG. 7 shows a schematic perspective view of a phased-array probe mount on the hollow shaft of FIG. 2.

Following the TOFD measurement of the shadow regions 11 and, if applicable, of any additional component regions, the shaft 2 can be tested additionally by means of an ultrasonic phased-array probe 8, as shown schematically in FIG. 3. In the exemplary embodiment described here, an ultrasonic phased-array probe 8 is used that, similar to the probes 12, 13, is held by an additional probe mount 22 manufactured by a rapid prototyping process and shown in FIG. 7 in a schematic perspective view. The probe mount 22 has a handle 23, by means of which it can be positioned by a user conveniently and safely externally on the shaft 2. The ultrasonic phased-array probe 8 held by the probe mount 22 is connected in a well-known manner via a cable 25 to a phased-array memory and analysis unit (not shown in the figures). For the phased array measurement, the shaft 2 is again rotated in order to be able to cover the full circumference. The distance travelled in this process is recorded by a phased array encoder 24 mounted on the phased-array probe mount 22 and assigned to the phased array probe 8. The phased array probe 8 is arranged at a defined start position and at the same axial positions as those for the TOFD test in order to be able to unite the measurement positions of the phased array measurement with those of the TOFD measurement. The results from the TOFD and phased array measurements can then be correlated.

As a result, the shaft 2 can be inspected reliably for flaws, in particular including in the particularly safety-relevant region of the threaded holes 5, and reliable and safe operation of the turbine, and hence of the nuclear power plant comprising this turbine, can be guaranteed.

It should be mentioned that it is obviously also possible that the stub shaft 1 is tested non-destructively for flaws in the aforementioned manner, in which case particular regions lying radially behind the through-holes 3 are then tested via TOFD.

Although the invention has been illustrated and described in detail using the exemplary embodiment, the invention is not limited by the disclosed examples, and a person skilled in the art can derive other variations therefrom without departing from the scope of protection of the invention.

The invention claimed is:

1. A method for non-destructive testing of a component for internal flaws, comprising:
   a) providing a rotationally symmetric component which comprises a plurality of openings, or cylindrical openings, or holes, that are arranged on one or more hole circles and are spaced apart from one another;
   b) arranging outside the component a transmitter probe acting as an ultrasonic transmitter and a receiver probe acting as an ultrasonic receiver, which are spaced apart from each other such that the transmitter probe can beam ultrasonic waves into a shadow region lying behind one of the openings in the component, and the receiver probe can receive ultrasonic waves which are diffracted by at least one flaw present in the shadow region; and
   c) determining using a time-of-flight diffraction technique whether one or more flaws are present in the shadow region;
   wherein a blind distance from the relevant opening is calculated as a function of dimensioning of the component and/or the position and/or size of openings and/or the position of the transmitter probe and/or receiver probe, which blind distance defines a blind region, in which flaws in the shadow region cannot be detected, and which is incorporated in a calculation of the size of detected flaws.

2. The method as claimed in claim 1,
wherein the shadow regions behind a plurality of openings in the component are inspected for flaws non-destructively in each case by performing steps b) and c).

3. The method as claimed in claim 1,
wherein for the non-destructive testing of a plurality of shadow regions, the transmitter and receiver probes and the component are moved relative to one another, and/or
wherein the transmitter and receiver probes and/or the component perform a relative movement in a circumferential direction, and/or
wherein at least one encoder, which is in contact with the component, is used to acquire the position of the transmitter and/or receiver probe relative to the component.

4. The method as claimed in claim 1,
wherein in step b), the transmitter and receiver probes are arranged such that ultrasonic waves radiated by the transmitter probe into the shadow region propagate to one side of the opening lying in front of the shadow region, and ultrasonic waves that are diffracted by at least one flaw present in the shadow region and reach the receiver probe propagate to the opposite side of the opening lying in front of the shadow region.

5. The method as claimed in claim 1,
wherein the component is inspected in an assembled state non-destructively for flaws, and/or
wherein a cylindrical hollow shaft, or a cylindrical hollow shaft closed at both end faces in the assembled state, is provided as the component in step a).

6. The method as claimed in claim 5,
wherein the hole circle(s) on which the openings in the provided component are arranged is/are coaxial with a rotational axis of the component.

7. The method as claimed in claim 6,
wherein the transmitter and receiver probes are provided on a curved rail, or on a rail in the shape of a circular ring or circular ring segment, each preferably attached by a probe mount, and
wherein the rail is arranged coaxial with the rotational axis of the component, and/or a radius of the rail is selected according to a radius of the component.

8. The method as claimed in claim 7,
wherein the transmitter and receiver probes are mounted on the rail at a specified separation from one another and/or at defined angles of incidence.

9. The method as claimed in claim 8,
wherein the specified separation and/or defined angles of incidence is/are selected according to the radius of the component and/or the positions and/or size of openings in the component.

10. The method as claimed in claim 1,
wherein the component is additionally examined non-destructively for flaws using at least one phased-array ultrasonic probe.

11. A device for performing the method according to claim 1, comprising:
   a transmitter probe acting as an ultrasonic transmitter, which is designed to emit ultrasonic waves;
   a receiver probe acting as an ultrasonic receiver, which is designed to detect ultrasonic waves;
   a curved rail, or a rail in the shape of a circular ring or circular ring segment, on which are mounted the transmitter probe and the receiver probe.

12. The device as claimed in claim 11,
wherein the position of the transmitter probe and/or the receiver probe is freely adjustable on the rail.

13. The device as claimed in claim 11,
wherein the transmitter probe and/or the receiver probe are each mounted on the rail by a probe mount, or probe mount which has been manufactured by a rapid prototyping process.

14. The device as claimed in claim 11,
wherein at least one encoder is provided, which is adapted to be brought into contact with a component under test, and is designed to acquire the position of the transmitter probe and/or receiver probe relative to the component.

15. The device as claimed in claim 11,
wherein the device comprises at least one phased-array ultrasonic probe and at least one phased array encoder, which is assigned to the phased-array ultrasonic probe and is adapted to be brought into contact with a component under test, and is designed to acquire the position of the phased-array ultrasonic probe relative to the component.

16. The method as claimed in claim 1, wherein the openings are spaced at least substantially equidistantly apart from one another.

17. The device as claimed in claim 12, wherein locking means are provided, by which the transmitter probe and/or the receiver probe can each be locked in a selected position, or
wherein the transmitter and/or the receiver probe are can be positioned and locked at defined positions on the rail.

* * * * *